United States Patent Office 3,280,140
Patented Oct. 18, 1966

3,280,140
PROCESS FOR MANUFACTURING
POLYAMIDE RESIN
Hubert Joseph Sharkey, Cincinnati, Ohio, assignor to Emery Industries, Inc., Cincinnati, Ohio, a corporation of Ohio
No Drawing. Filed Mar. 27, 1963, Ser. No. 268,447
3 Claims. (Cl. 260—309.6)

This invention relates to a new and improved process for reacting polymeric fat acids with an alkylene polyamine to provide a polyamide resin of the type having a relatively high amine number and a low viscosity. The particular resins with which this invention is concerned are those which have an amine number of from about 270 to 340 and a (Brookfield) viscosity of from about 4 to 12 poises at 75° C.

The art teaches (see U.S. Patent No. 2,881,194, issued April 7, 1959, to Peerman and Floyd) that polyamide resins of the type with which this invention is concerned can only be prepared by the practice of a two-step method wherein polymeric fat acids and a suitable polyamine are first reacted at elevated temperatures to produce a preliminary polyamide resin having an amine number of from 80 to 230. An additional quantity of the polyamine reactant is then added to this preliminary resin, with the resulting mixture then being further reacted to produce the polyamide resin of the desired (higher) amine number and lower viscosity.

The two-step method of the art is a very lengthy one and thus suffers from unusually high operating costs. Thus, the first step requires that the product be maintained at reaction temperature (e.g., 200° C.) for about 4 hours, while the second step requires an added heating period of 2 hours at this temperature. Preparation times are lengthened even more as the preliminary product is cooled or otherwise processed before adding the final increment of polyamine and proceeding to the second heating-reaction step.

It is an object of this invention to provide a one step rather than a two step process for producing the polyamide resin products which are described here and in the aforesaid Peerman et al. patent. A more particular object is to provide a process of this character which requires but a relatively short period of heating once reaction temperatures are reached. The nature of still other objects of the invention will be apparent from a consideration of the descriptive portion to follow.

It has now been discovered that the foregoing objects can be obtained by the practice of a simple, one-step process wherein a reaction mixture containing a lower polyethylenepolyamine, polymeric fat acids and monomeric fat acids, in the required proportions is brought to a temperature of about 250 to 285° C. and maintained at said temperature for about 0.5 to 3 hours. Water produced during the reaction is distilled off from the reaction mixture as it is brought up to said temperature and maintained thereat, the reaction being deemed complete when evolution of water substantially ceases. At the conclusion of this heating period the product is preferably cooled and subjected to treatment in vacuo to remove final traces of moisture. The resulting product will be found to have an amine number of from about 270 to 340 (the precise value depending on the proportion of polyamine employed, as described below) and a viscosity in the range of from about 4 to 12 poises as measured at 75° C. (Brookfield).

As used herein, the amine number is defined as the number of milligrams of potassium hydroxide equivalent to the free amine group in one gram of the resin.

The polyamine reactant is one selected from the group consisting of diethylenetriamine, triethylenetetramine and tetraethylenepentamine. Mixtures of these amines can also be employed. The preferred reactant is triethylenetetramine. This compound contains 4 reactant amino groups, so a gram molecular weight thereof will contain 4 equivalents. This factor becomes 3 equivalents in the case of diethylenetriamine and 5 in the case of tetraethylenepentamine. In the preferred practice of this invention, the reaction mixture is so formulated as to provide a total of from about 3.5 to 3.7 equivalents of the polyamine for each equivalent of acid employed in the polymeric-monomeric fat acid mixture, for within this range polyamide products are obtained having amine numbers of about 290 to 320. By upping the proportion of amine employed to about 3.9 equivalents per equivalent of acid, polyamide products having amine numbers as high as 340 can be obtained. Conversely, by reducing the amine content to about 3.3 equivalents, per equivalent of acid, there are formed polyamides having amine numbers as low as about 270.

The polymeric fat acid portion of the reaction mixture is that commonly referred to in the art as "dimer acid." This product can be produced by a variety of known processes, see for example, U.S. Patents Nos. 2,482,761, 2,793,219, 2,793,220 and 2,955,121. As the starting material for use in preparing polymeric acids there is employed an unsaturated fatty acid material such as that recovered from tall oil or derived from a glyceride oil such as safflower, soybean, corn, sunflower seed, peanut, linseed or tung oil or from an animal fat or oil. The polymerizable acids in these materials are long chain, unsaturated, aliphatic carboxylic acids such as oleic acid, linoleic acid, linolenic acid, eleostearic acid and the like. Polymerization is effected in most commercial operations by heating the acids in an autoclave at temperatures of about 230° C. in the presence of water and a surface-active clay. On filtering off the clay there is recovered a product containing polymer (mostly a $C_{36}$ dicarboxylic acid dimer, along with lesser amounts of a $C_{54}$ tricarboxylic acid trimer), with the balance of the mixture comprising monomeric (principally $C_{18}$) fatty acids which have not been polymerized. The polymeric acid product used in the present invention is recovered from the polymeric reaction mixture, usually by distilling off all or part of the monomeric component. In other cases the polymer fraction can be subjected to added distillation procedures wherein the dimer portion is distilled off, thus giving a product which is very low in trimer content as well as in monomer. However, insofar as concerns the present invention, the content of trimer is not critical, and the same may range from a portion of one percent up to values of 20% or even 25%. As a practical measure, the commercially available dimer acid products contain one equivalent of acid for each 286 grams of the material, whether pure dimer, dimer admixed with trimer, or dimer admixed with monomer and/or trimer.

Lastly, the reaction mixture employed in the present invention to form a polyamide resin contains a small amount of one or more monomeric fatty acids of the type containing from about 12 to 22 carbon atoms, said amount being 0.03 to 0.2 eq. per eq. of polymeric fat acids. Representative acids which can be employed are oleic acid, stearic acid, palmitic acid, myristic acid and lauric acid, as well as mixtures thereof. There also may be employed the monomeric material (referred to above) which is present in the polymerized acid mixture at the conclusion of the polymerization step, and which is distilled from the mixture to recover the polymeric acid product. Oleic acid is the preferred monomeric acid for employment in a practice of this invention.

The process hereof is carried out by heating the mixed reactants in a vessel arranged to permit water distilled from the heated reaction mixture to be removed from the system, while returning the non-aqueous portions of the distillate to said mixture. The preferred practice is to use a vessel provided with a reflux condenser incorporating a dephlegmator element for separating the aqueous distillate portion. Whatever the nature of the apparatus employed, the reaction mixture is brought up to the desired temperature in the range of 250–285° C. and held thereat until evolution of water substantially ceases. At this point, the total amount of water distilled from the system should be from 1.4 to 1.6 moles per equivalent of acid originally present in the system. This is indicative of the fact that the system contains from 40 to 60% of imidazoline groups, since one mole of water is formed as each carboxyl group is converted to an amide linkage, while another mole of water is formed as each amide linkage is converted to become a part of an imidazoline nucleus.

The reaction mixture may be brought up to reaction temperatures (250 to 285° C.) fairly rapidly, e.g., in about 0.5 to 2 hours, though much longer times are quite acceptable when heating facilities make it impractical to utilize a shorter period. The length of time to hold the reaction mixture at 250 to 285° C. also may vary somewhat depending on the nature of the reactants, the equipment used and the particular temperature. Thus, heating for 1 to 3 hours at 250° C. may suffice to bring the mixture to the point where further evolution of water ceases. Shorter periods are possible at higher temperatures, heating time of 0.5 to 1 hour being common when using preferred temperatures of from about 265 to 280° C.

Temperatures materially below about 250° C. are not productive of the desired polyamides even when the heating period is greatly prolonged. For one thing, the imidazoline content of the product never reaches the 40 to 60% level noted above at reaction temperatures below 250° C. On the other hand, the use of temperatures above 285° C. is to be avoided, for then imidazoline formation becomes unduly pronounced, with the resultant formation of highly cross-linked polymers of diminished potential activity as epoxy resin curing agents.

In the preferred practice of this invention when operating on a plant scale nitrogen or another inert gas is bubbled through the reaction mixture as it is being heated. This gaseous stream serves to stir the mixture, while also suppressing foaming and sweeping off aqueous and other vapors as they are evolved from the reaction mixture.

It is also recommended that the reaction mixture be provided with a small percentage (usually of the order of 0.05 to 0.25% by wt.) of an alkali metal phosphate (e.g., $Na_3PO_4$, $Na_2HPO_4$, $NaH_2PO_4$) or even of phosphoric acid. Usage of a material of this character results in a product of improved color apparently because the phosphorus-containing additive suppresses the solubility of iron and other heavy metals in the polyamide resin as it is being formed.

The invention is illustrated in various of its embodiments by the following examples.

Example 1

In this operation a mixture of 305 grams of dimer acid (Empol 1018, a product of Emery Industries, Inc., prepared by the polymerization of tall oil fatty acids and containing less than 1% monomer acids), 30.5 grams of oleic acid, 154.2 grams of triethylenetetramine and 0.25 gram of sodium diacid phosphate were mixed in a three-necked flask equipped with thermometer, stirrer and a Barret trap. This represented 3.58 equivalents of amine per total equivalent of acid. The vessel was heated at a relatively rapid rate using an electric mantel, the heating period being about 0.75 hr. from room temperature to 160° C. and 1 hour from 160 to 272° C. Water of reaction was removed as it was formed, there being collected a total of 32.5 grams of water and 1.6 grams of amine, the latter representing amine loss. At 272° C. the heating was stopped and the product cooled to 180° C. It was then subjected to a vacuum of 10 mm. Hg to remove the last traces of water. The water removed was sufficient for 53.3% imidazoline content.

The resulting product had good compatability with epoxy resins and was capable of curing the same in the desired manner. The product had the following characteristics:

Amine value _____ 312
Viscosity (poises at 75° C.) _____ 9
Viscosity (poises at 40° C.) _____ 85
Color (Gardner) _____ 7

Example 2

This operation was conducted using essentially the same equipment and heating procedures as outlined above in Example 1. In this case the reaction mixture was made up of 304.5 grams of dimer acid (same as Ex. 1) and 45.3 grams of oleic acid, for a total number of acid equivalents of 1.234, together with 56.7 grams of diethylenetriamine and 104.1 grams of tetraethylenepentamine, this being 2.2 equivalents of each amine. This represented approximately 3.6 equivalents of amine per equivalent of acid. The reaction mixture also contained 0.4 gram of sodium diacid phosphate.

During the course of the reaction there was recovered 33.8 grams of water and about 0.4 gram of amine not returned to the reaction vessel. This indicated formation of a polyamide product having an imidazoline content of about 52%. Other characteristics of the product, which serves well as an epoxy curing agent, are as follows:

Amine value _____ 306
Viscosity (poises at 75° C.) _____ 6.4

I claim:
1. A method for preparing a polyamide resin of the imidazoline type having an amine number of from 270 to 340 and a viscosity of from 4 to 12 poises at 75° C., said method comprising heating to a temperature of from about 250 to 285° C. a reaction mixture consisting essentially of
 (a) polymerized fat acids,
 (b) monomeric fat acids of from 12 to 22 carbon atoms, present in the amount of from 0.03 to 0.2 equivalent per equivalent of said polymerized fat acids, and
 (c) at least one amine selected from the group consisting of diethylenetriamine, triethylenetetramine and tetraethylenepentamine, present in the amount of from 3.3 to 3.9 equivalents per equivalent of total polymerized and monomeric fat acids,
distilling off water present in the reaction mixture as the heating progresses, and maintaining the said mixture within the aforesaid temperature range of about 250 to 285° C. until evolution of water from the mixture is substantially complete.

2. The method of claim 1 wherein the reaction mixture is maintained at temperatures between about 250 to 285° C. until the total amount of water distilled from the mixture over the course of the heating period is from 1.4 to 1.6 moles per equivalent of the total fat acids employed.

3. A method for preparing a polyamide resin of the imidazoline type having an amine number of from 290 to 320 and a viscosity of from 4 to 12 poises at 75° C., said method comprising heating to a temperature of from about 250 to 285° C. a reaction mixture consisting essentially of
 (a) polymerized fat acids,
 (b) monomeric fat acids of from 12 to 22 carbon atoms, present in the amount of from 0.03 to 0.2 equivalent per equivalent of said polymerized fat acids, and (c) at least one amine selected from the group consisting of diethylenetriamine, triethylenetetramine and tetraethylenepentamine, present in the amount of from 3.5 to 3.7 equivalents per equivalent of total polymerized and monomeric fat acids, distilling off water present in the reaction mixture as the heating progresses, and maintaining the said mixture within the aforesaid temperature range of about 250 to 285° C. until evolution of water from the mixture is substantially complete.

References Cited by the Examiner
UNITED STATES PATENTS

| | | | |
|---|---|---|---|
| 2,155,878 | 4/1939 | Waldman et al. | 260—309.6 |
| 2,574,537 | 11/1951 | De Groote et al. | 260—309.6 |
| 2,646,399 | 7/1953 | Hughes | 260—309.6 |
| 2,940,927 | 6/1960 | Hughes | 260—309.6 |
| 2,987,521 | 6/1961 | Hughes et al. | 260—309.6 |
| 3,050,529 | 8/1962 | Dearborn et al. | 260—309.6 |

WALTER A. MODANCE, *Primary Examiner.*
NATALIE TROUSOF, *Assistant Examiner.*